(12) United States Patent  (10) Patent No.: US 8,442,343 B1
Rose, III  (45) Date of Patent: May 14, 2013

(54) OPTIMIZATION OF STAGED COMPUTATIONS

(75) Inventor: Charles F. Rose, III, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 996 days.

(21) Appl. No.: 12/475,142

(22) Filed: May 29, 2009

(51) Int. Cl.
*G06K 9/40* (2006.01)
(52) U.S. Cl.
USPC .......................................................... 382/260
(58) Field of Classification Search ................... 382/260; 717/140, 145, 146, 148, 151, 154
See application file for complete search history.

(56) References Cited

U.S. PATENT DOCUMENTS

| 6,427,234 B1* | 7/2002 | Chambers et al. ............ 717/140 |
| 2005/0015358 A1* | 1/2005 | Min ................... 707/1 |
| 2005/0188382 A1* | 8/2005 | Nagendra et al. ............ 719/328 |
| 2005/0198624 A1* | 9/2005 | Chipman ..................... 717/146 |

OTHER PUBLICATIONS

Strengert, Magnus, et al., "A Harware-Aware Debugger for the OpenGL Shading Langauge", *Graphics Hardware*, (2007), 9 pgs.
Greskamp Brian, "A Simple Value Range Propagation Pass for SUIf-1", accessed via Internet at the following website: http://iacoma.cs.uiuc.edu/~greskamp/pdfs/426.pdf, (Dec. 17, 2003), 8 pgs.

* cited by examiner

*Primary Examiner* — Gregory F Cunningham
(74) *Attorney, Agent, or Firm* — Schwegman Lundberg Woessner P.A.

(57) ABSTRACT

Systems, methods, and apparatuses are described for providing one or more optimized functions for image processing and/or signal processing. Some exemplary methods described include receiving a media input and performing a first function of a staged computation on the media input to generate a result, the result comprising a constant value. Using the result, a second function of the staged computation may be compiled. The second function may correspond to inputs between a first value and a second value inclusive of the constant value. The second function may be performed to generate a media output.

23 Claims, 6 Drawing Sheets

OPTIMIZATION OF STAGED COMPUTATIONS

BACKGROUND

Complex calculations can often be broken into discrete stages where, at the later stages, the results of earlier stages are effectively constant. Typically, the later stages may be more computationally expensive than the earlier stages. When this occurs, the computation may be referred to as a "stage imbalanced computation."

A multi-frequency computation is a stage imbalanced computation where the later stages are used to generate an increasingly large dataset by performing many calculations on an initial dataset. Examples of multi-frequency computations include many commonly used image processing and general signal processing computations. An example multi-frequency computation may include a later stage that sets every pixel in an input image to a color that was calculated in an earlier stage.

DETAILED DESCRIPTION

In image and signal processing, a computation may be performed in one or more stages. To perform a computation in multiple stages, the results of earlier stages are expressed as constants. Mathematically, the staged computation may be described as:

$$r_0 = f_0(i)$$

$$r_1 = f_1(r_0, i)$$

$$r_n = f_n(r_1, \ldots, r_{n-1}, i)$$

where r indicates the results calculated at each stage n, i is an initial set of input parameters, and $f_n$ is the computation performed at each stage n, and $r_n$ is the final result of the entire staged computation. As can be seen from the above, each stage in the staged computation uses the results of a previous stage to calculate a new set of results. It should be noted that not all results may be used in a subsequent stage nor is a stage limited to only the results of the stage immediately prior to itself.

If any of the later stages are significantly more computationally expensive than other stages, it may be possible to optimize the later stages to yield a more efficient computation. The cost associated with optimizing the later stages may be amortized over repeated runs of the staged computation. In some computations, the cost associated with optimizing may be recovered within a single execution of the staged computation. Additionally, these techniques may be particularly useful when computations are performed many times, such as in interactive image processing applications.

Typically, later stages generate very large datasets, as these stages involve either an implied or explicit loop over an existing large dataset. Later stages are those stages that receive the results of at least one prior stage as input values. As such, it may be desirable to optimize the later stages in particular. For example, one way to optimize these later stages described below is to modify the input range of the stage using range propagation.

Figure 1:
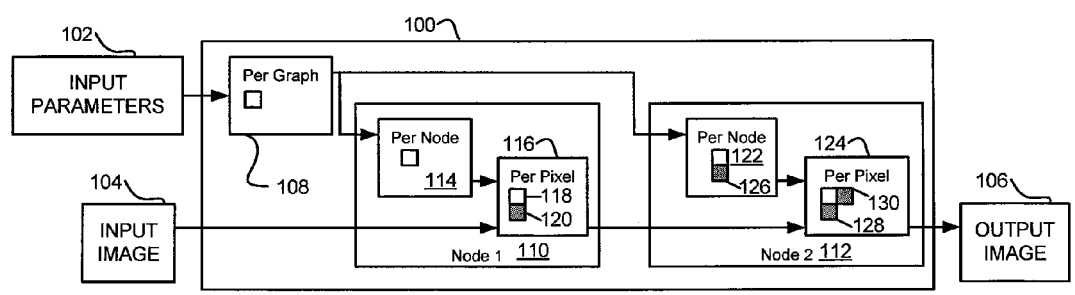
FIG. 1 is a block diagram depicting one or more optimized functions.

FIG. 1 is a block diagram of a staged computation 100 having one or more optimized functions. Computation 100 is associated with two inputs—the first being input parameters 102 and the second being input image 104 that may include one or more images or signals. The computation 100 may have one or more outputs (e.g., the output image 106). The computation 100 may include one or more stages occurring at various frequencies within the computation 100. In order of increasing frequency, a stage may include a per graph function, a per node function, and/or a per pixel function. To illustrate, a function performed once during the computation 100 is referred to as a "per graph function" because the computation 100 is depicted herein as a graph. In the embodiments described herein, a per node function and one or more per pixel functions are referred to in the aggregate as a "node." In some instances, a function or a node may be generically referred to as a "kernel." At a first stage, a per graph function 108, is shown as a first function performed within the computation 100. The computation further includes a first node 110 and a second node 112.

The input parameters 102 may be received from a user and/or provided, in one embodiment as a default. The input parameters 102 (e.g., parameters i described above) may have values that occur as variables within a portion of the stages of the computation 100. A portion of the input parameters 102 may be used by more than one stage of the computation 100. Examples of input parameters 102 may include a tint color for a tint function, a blur radius in a blur function, and other constants that will be apparent to those skilled in the art.

A per graph function 108 is typically performed once per computation 100 as a first stage. The per graph function 108 may be used in conjunction with the input parameters 102 to modify or optimize later stages of the computation 100. The per graph function 108 may operate to cause the optimized version of a function within at least one of the one or more nodes to be compiled and/or selected for the computation 100 based on one or more of the input parameters 102. The per graph function 108 may reorganize or reorder one or more nodes within the computation 100. In some instances where the computation 100 is performed more than once using consistent input parameters 102 or where it is a sufficiently expensive portion of the computation 100, the per graph function 108 may itself be optimized.

The computation 100 may comprise one or more nodes that execute functions to be performed based on at least a portion of the input parameters 102 and the input image 104. Examples of nodes include blur, tint, filters, and visual effects. Each node includes at least one per node function 114 and at least one per pixel function 116. Like the per graph function 108, the per node function 114 may only receive the input parameters 102 as input. In some instances, and as shown, the parameters may be modified by the per graph function 108 prior to being received by the per node function 114. The per node function 114 may operate to compile an optimized per pixel function, select a per pixel function, and/or modify a parameter and/or per pixel function prior to the execution of the per pixel function.

To illustrate, a per pixel function (e.g., per pixel function 116) may be written to accept all possible inputs. This means each variable in the function is defined over all possible numbers (i.e., from −∞ to +∞). In FIG. 1, these functions are depicted as unshaded squares within each stage of computation 100. In the later stages of a staged computation, some knowledge about a possible range of inputs into the stage may be available to the programmer. This information allows the use of optimization techniques such as range and constant propagation. For example, if the ranges of the input values to an operation are known, the potential values of the output may be discernable. For example, if the function performed by a later stage is:

$$x=y+z*2$$

and it is known from the results of a prior stage that y is in the range [2 . . . 3] and that z is in the range [5 . . . 10], then it is possible to determine that x will have a value in the range [12 . . . 23] because 2+5*2=12 and 3+10*2=23. Accordingly, a subsequent function that uses x as an input value may be optimized within the range [12 . . . 23] by a per node function (e.g., per node function 114) associated with the subsequent per pixel function. In some instances, range propagation may not yield useful results, such as if it is known that w is in the range [−1 . . . 1] and the next statement is $$x'=x/w$$

because the possibility of w having a value of zero means that x can be divided by zero, and, in turn, expanding the range of possible values of x' to an infinite set. If, however, the per-pixel function is:

$$x=y+z*2$$

$$x'=x/w$$

and it is known that w=1, the functions may be optimized because anything divided by one is unchanged. So the per pixel function may be rewritten by the per node function to remove the computationally expensive divide operation of the second operation as shown:

$$x=y+z*2$$

$$x'=x$$

Range and constant propagation may be one technique of several used to optimize functions within a staged computation. In contrast to typical functions that can operate on inputs within a set having an unlimited range of values (i.e. −∞ to +∞), the optimized functions may provide accurate calculations over only a subset of the unlimited range of values (i.e., the subset excludes at least one value from the unlimited range of values). The subset may be finite (e.g., whole numbers between −5 and +5) or infinite (e.g., positive real numbers) and may or may not be continuous. The subset may be a determinable range between a first value and a second value and may or may not include the first value and/or the second value.

While the above example is written in the context of a per node function being used to optimize a per pixel function, it is with the understanding that a per graph function may, in turn, optimize a per node function and/or a per pixel function, and vice-versa. Each stage may be optimized independently of the other stages. As illustrated here, the output values of the optimized function are equivalent to, and interchangeable with, the output values of a generic function provided that the range requirements on the input parameters are obeyed.

Returning to FIG. 1, first node 110 further includes a per pixel function 116. The per pixel function 116 receives the input parameters 102 via the node function 114 within the second node 112 as input. The per pixel function 116 also receives the input image 104 as an input. In the per pixel function 116, two functions are shown. The first function 118 is depicted as an unshaded square and is able to accept any input and is therefore not optimized. The second function 120 is depicted as a shaded square and is able to receive only a limited range of input from the per node function 114 and/or from the input image 104. The per node function 114 may provide an indication of whether the first function 118 or the second function 120 should be used to perform the per pixel function 116.

The second node 112 comprises a second per node function 122 associated with a second per pixel function 124. The per node function 122 comprises both a general function and an optimized function 126. The optimized function 126 may be executed instead of the general function upon receiving a command from the per graph function 108. Because of this staged nature of the computation 100 within the second node 112, the output of the optimized function 126 may be used in the per pixel function 124 with either the generic function or an optimized function. As depicted in FIG. 1, the second node 112 includes two optimized per pixel functions 128 and 130. In some instances, per node function 122 may provide a command to execute one of the two optimized per pixel functions in a given computation. In other embodiments, an additional switching function may be inserted between the per node function 122 and the per pixel function 124 to select one of the functions available within the per pixel function 124.

For example, from a generic function, the first optimization function may be generated over an arbitrary range of at least one input parameter of a set of input parameters. The arbitrary range may include, for example, all positive numbers or all negative numbers. In another example, an optimization function may be generated from a generic function over a known useful range of values. A useful range of values may be determined based on an analysis of prior computations using the same function or commonly used values such as using the color black as a tint color in a tint function. As shown in connection with the second node 112, more than one optimized function may be generated for each of the generic functions. An optimized function may be selected based on efficiency or computational cost.

Figure 2:
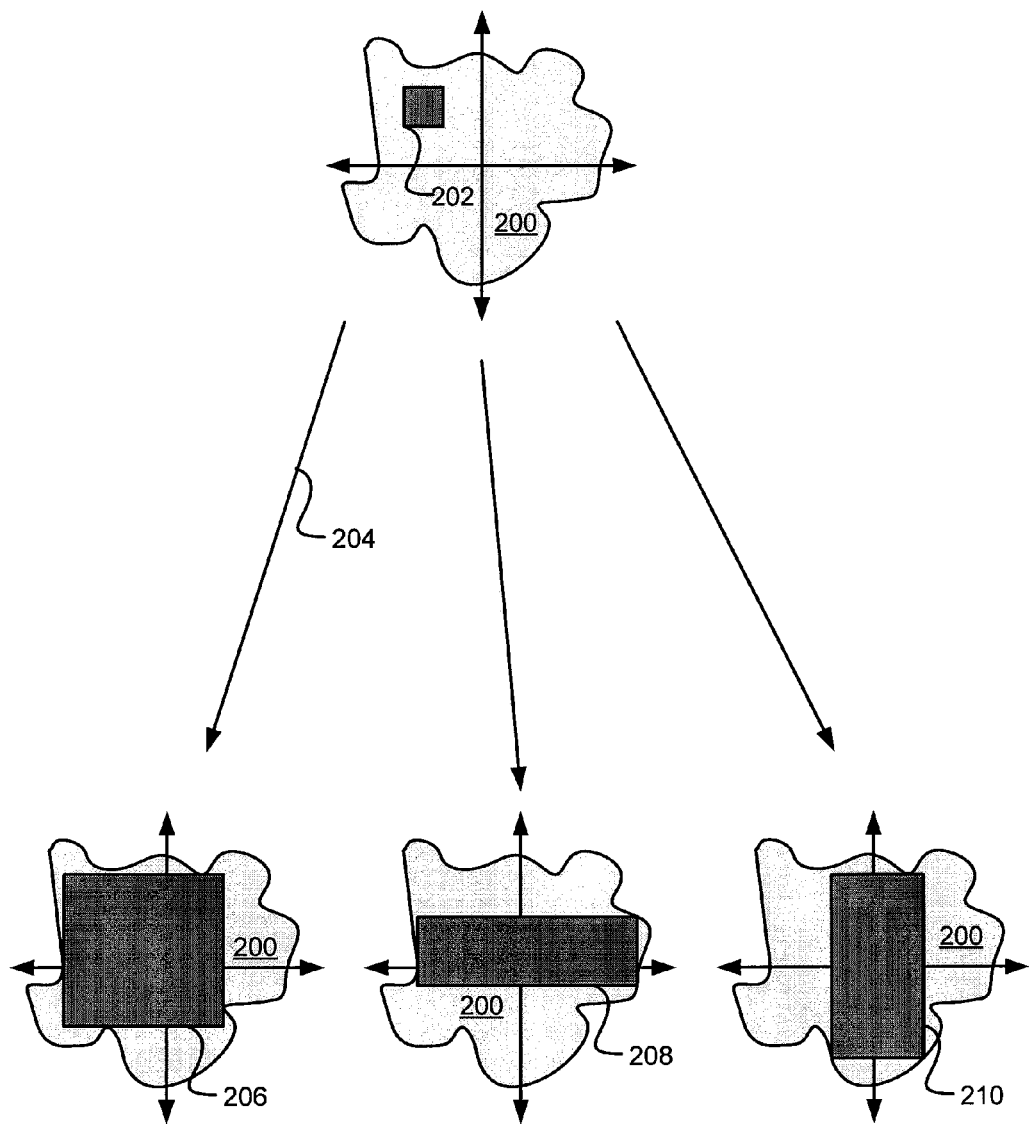
FIG. 2 is an illustration of exemplary ranges over which an optimized function may be created.

FIG. 2 depicts exemplary ranges over which an optimized function (e.g., optimized function 120, 126, 128, and/or 130 shown in FIG. 1) may be created. As discussed above, a function may include one or more input parameters (e.g., input parameters 102 shown in FIG. 1). For the purposes of illustration in connection with FIG. 2, an exemplary function is assumed to have two input parameters. In the depiction of FIG. 2, a possible optimization range 200 is depicted over a range of values of both variables along an x-axis and along a y-axis. A first optimized function 202 is depicted as a darker shaded region within the possible optimization range 200. The first optimized function 202 may be generated for a specific input image and/or a specific set of input parameters.

In some instances, it may be desirable to expand the first optimized function 202 over a larger portion of the possible optimization range 200 for which the first optimized function 202 generates equivalent results to reduce the amount of optimization work to be performed to execute the computation 100 of FIG. 1. For example, the function may be a commonly used function or may be repeated several times within a computation 100 with more than one input image (e.g., input image 104 shown in FIG. 1). In a first expansion 204, a second optimized function 206 may be generated with by expanding upon the values around the first optimized function 202 in order to apply to a larger portion of the possible optimization range 200. The values may be expanded by incrementing the value of one or more of the input parameters in determining whether the same first optimized function 202 is generated over the larger range. This approach may be repeated over a larger and larger range to determine the range of the second optimized function 206. The output of the second optimized function 206 is equivalent to the output of the first optimized function 202, which is equivalent to the output of a generic function that is being optimized.

In a further embodiment, the third and fourth optimized functions 208 and 210 may also be generated over a portion of the possible optimization range 200 that may or may not include all or part of the range covered by the first optimized function 202.

In operation, a function or set of functions may correspond to a set of input parameters (e.g., parameters i described above). Each of the input parameters may appear to a user as a separate slider in a user interface. Typically, a user is only able to adjust one input parameter at a time. While one parameter is modified, the other parameters may be considered constant. However it is unlikely that each of the other parameters will always be set to a consistent constant value, as such it may be desirable to optimize a function in view of more than one input parameter as discussed in connection with FIG. 2.

Figure 3:
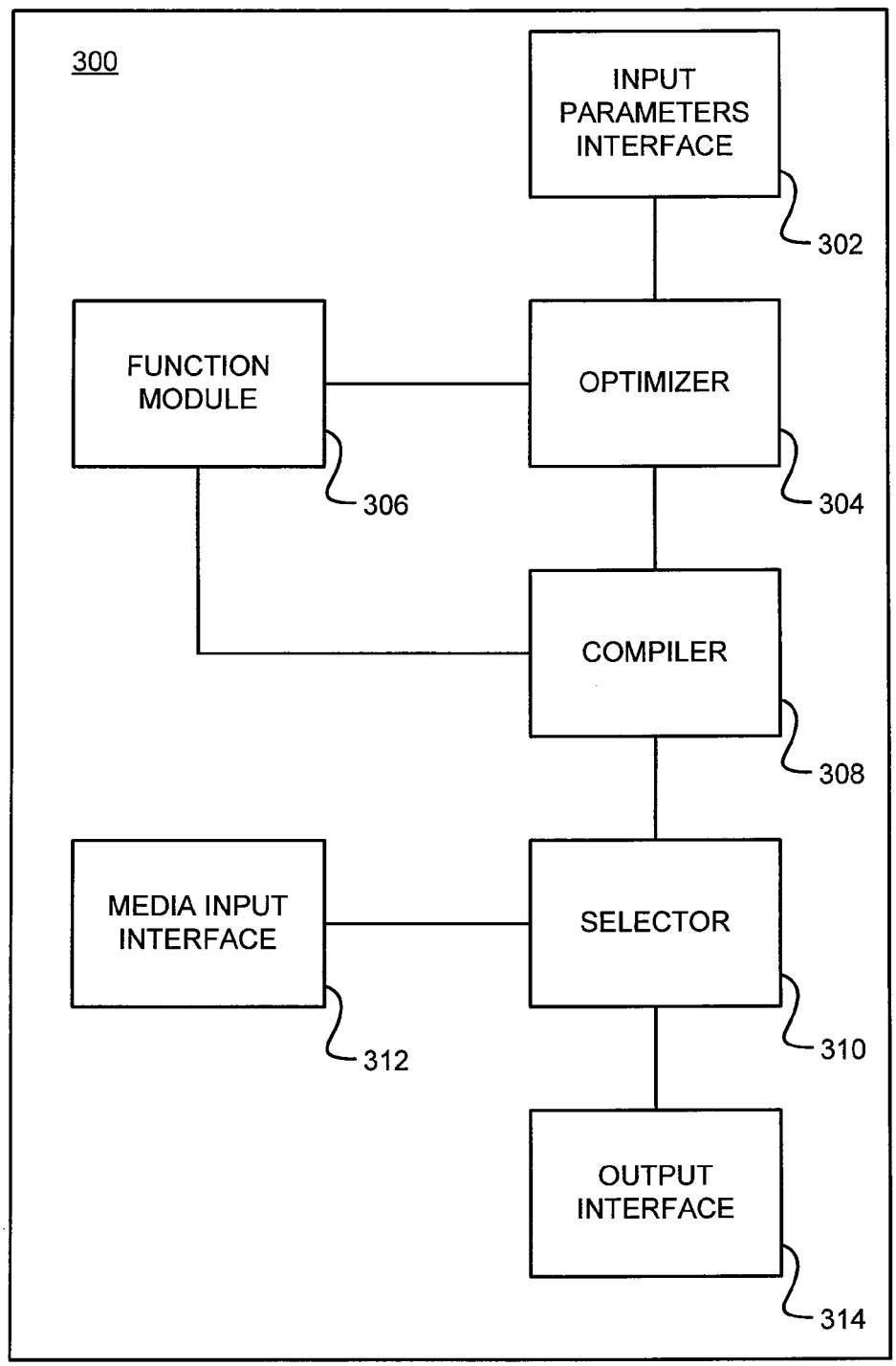
FIG. 3 is a block diagram of an exemplary system for optimizing functions according to various embodiments.

FIG. 3 is a block diagram of a system for optimizing staged computations according to various embodiments. The system 300 may comprise an input parameter interface 302, an optimizer 304, a function module 306, a compiler 308, a selector 310, a media interface 312, and an output interface 314. The system 300 operates to assemble the staged computation and may be used in conjunction with image processing software such as PHOTOSHOP® image processing software by ADOBE SYSTEMS INC. of San Jose, Calif. The system may compile the computation just before execution and/or during execution.

The input parameter interface 302 is to receive values of input parameters 102 shown in FIG. 1 from a user and/or to access default values of input parameters 102 stored in a memory. In some embodiments, the input parameter interface may receive the diagram used to depict the computation 100 shown in FIG. 1 or its equivalent from the user. In other embodiments, the computation 100 may be received via a separate interface (not shown).

Based on the input parameters, the optimizer 304 may determine whether to optimize one or more of the generic functions that correspond to the functions within the computation 100. The optimizer 304 may optimize the generic function based on generic functions within a function module 306. The function module 306 stores and accesses the not-optimized functions.

Based on the determination of the optimizer 304 and/or using the not-optimized functions within the function module 306, the compiler 308 may compile one or more optimized functions. In some instances, the compiler 308 may compile the optimized functions in real-time. In other instances, the compiler 308 may compile the optimized functions based on frequently occurring and/or default input parameters (e.g., using the color black in a tint function) and store the optimized functions for later use.

The selector 310 may determine whether prior to, or during the execution of, the computation 100 to execute a compiled optimized function or to execute a non-optimized function.

The selector 310 may receive the input image 104 shown in FIG. 1 via a media interface 312. In some instances, the selector may execute the computation 100. In other instances, the selector may cause a processor or a module (not shown) to execute the computation 100. After execution of the computation 100 is complete, the user may access the output image 106 shown in FIG. 1 via the output interface 314.

Figure 4:
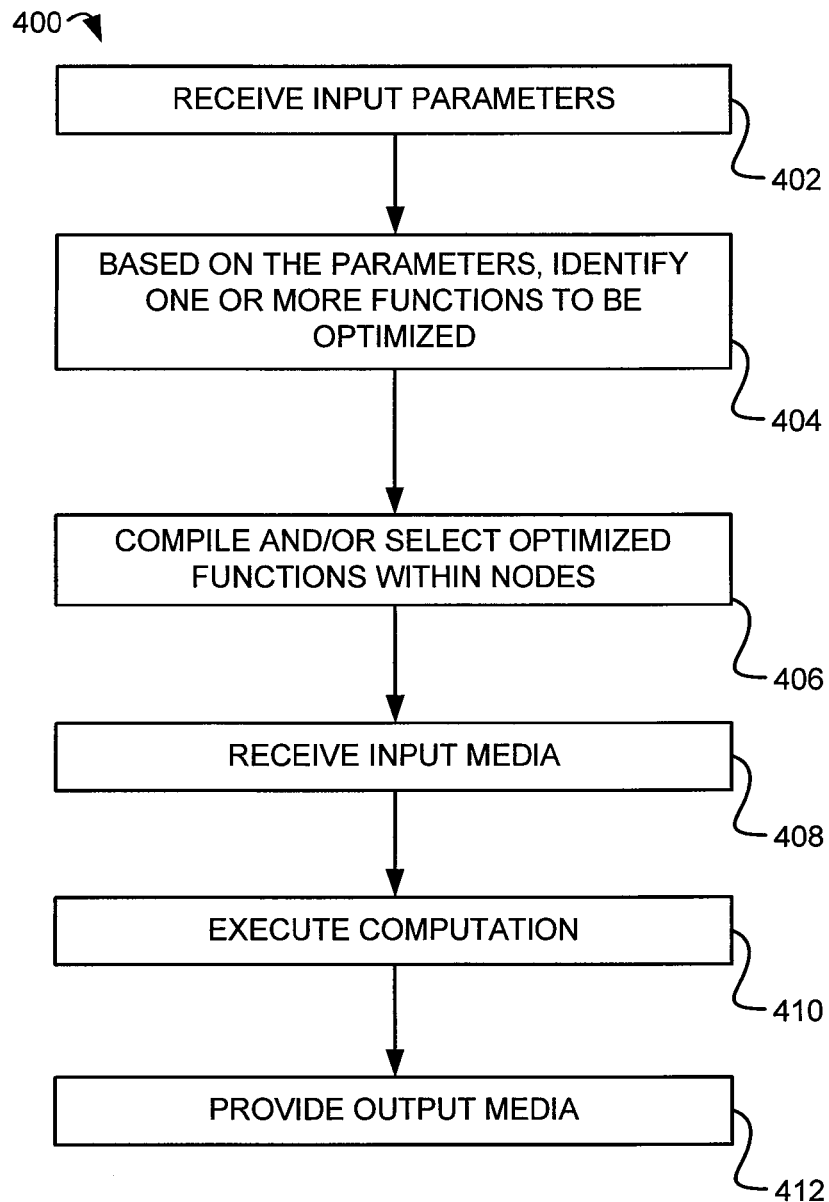
FIG. 4 is flowchart of an exemplary approach for selecting functions to optimize and for executing the optimized functions.

FIG. 4 is a flowchart of an exemplary approach 400 for selecting functions to optimize and for executing the optimized functions. For clarity, in the embodiments shown, the input parameters are received prior to the input image. It is understood that the input parameters may be received at the same time as, or after, the input image. In some instances, one or more input parameters may be changed while the computation is being executed. In these instances, the approach 400 may be restarted and/or re-performed for the remaining functions in the computation.

In an operation 402, input parameters (e.g., input parameters 102 shown in FIG. 1) are received by the input parameter interface 302 shown in FIG. 3. In an operation 404, one or more functions (e.g., those functions stored by the function module 306 shown in FIG. 3) within the computation 100 of FIG. 1 may be identified for optimization by the optimizer 304 shown in FIG. 3 based on the values associated with the parameters. The functions may be identified based on one or more heuristics. In some instances, the heuristics may operate to point to one or more of the nodes containing the functions.

The heuristics may be based on data derived from previous stages in the computation 100 and/or historical data related to the functions and/or the computation 100. The heuristics may comprise determinations of whether a certain value is within a specific range or a range propagated from a prior stage, for example. In some instances, the heuristics may be based on a histogram of an input image or a determination that one or more of the functions may be particularly suited to optimization. Historical data may include past runtimes of the functions within the computation 100, past amenability of a function to optimization, and input parameters used in the past. Some heuristics may rely on program size and/or the availability of stored previously-optimized functions. Other optimizations that may be performed include, for example, unrolling loops having a loop control variable (LCV) rendered constant by range propagation and/or an input parameter, removing runtime checks of array bounds, removing tests for zero before a divide operation, removing conditionals, and the like.

Once identified, the approach 400 may operate to generate or select the optimized functions in an operation 406 using the compiler 308 shown in FIG. 3 and/or the selector 310 shown in FIG. 3. As discussed in connection with FIG. 1, the function may already include one or more optimized functions in addition to a generic function. In some instances, one or more optimized functions may be generated and compiled based on the identification of the operation 402. The compilation of the optimized function may comprise generating a switching function or determination to select the optimized function.

In an operation 408, the media input may be received or accessed by the media interface 312 shown in FIG. 3. The media input may comprise one or more images (e.g., a picture or a movie). In some instances, one or more attributes of the media input may be determined by, for example, tiling the media input into portions and/or generating a histogram of at least a portion of the media input. In these instances, the approach 400 may return to operation 402 prior to executing the computation in an operation 410. In other instances, the approach 400 continues to execute the computation in the operation 410. In an operation 412, the output media is provided to a user via the output interface 314 shown in FIG. 3.

Figure 5:
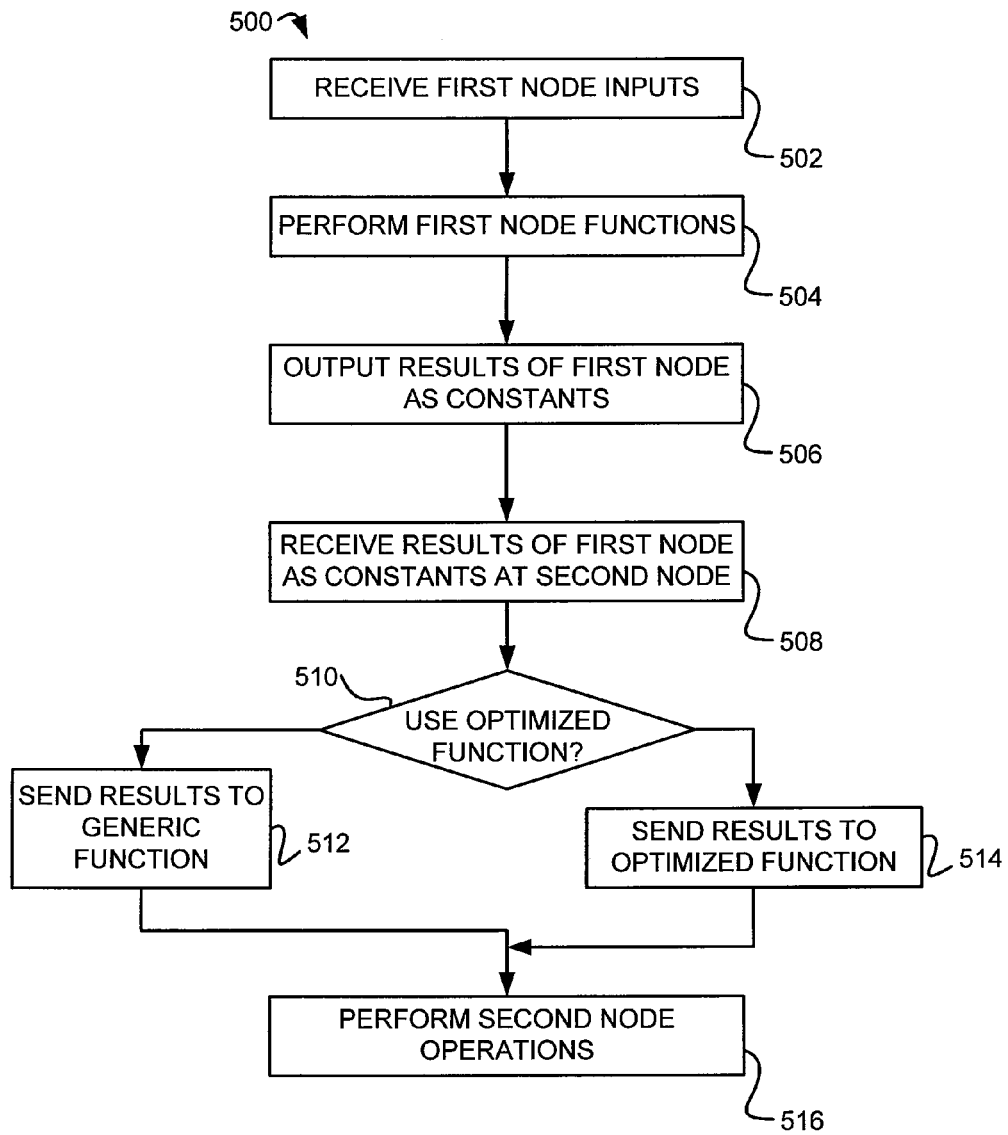
FIG. 5 is a flowchart of another exemplary approach used to determine whether to compile an optimized function.

FIG. 5 is a flowchart of another exemplary approach 500 used to determine whether to execute an optimized function as appropriate. The approach 500 may be performed during the execution of the computation to select one or more optimized functions. In some instances, an optimized function may be compiled during the execution of the computation 100 (e.g., while a previous staged is executed).

In an operation 502, the inputs to a first node may be received. The inputs may comprise one or more parameters and/or input images. In an operation 504, the first node (e.g., first node 110 of FIG. 1) may perform the functions within the node. At an operation 506, the first node may output the results of one or more operations on the input media as constant values.

The results of the first node are received as constants at a second node (e.g., second node 112 shown in FIG. 1) in an operation 508. Based on these constants, a per node function such as per node function 122 shown in FIG. 1 may determine, in an operation 510 and/or using the selector 310 shown in FIG. 3, whether to use an optimized version of the per pixel function 124 shown in FIG. 1. The determination may be made, for example, using one or more heuristics within the per node function 122. The heuristic may be included in the generic function or in an optimized function such as optimized function 126 shown in FIG. 1.

If the determination is made to not use an optimized function, the results of the first node (e.g., pixel values) are sent to the generic function (e.g., using the function module 306 shown in FIG. 3) within the per pixel function 124 in an operation 512. On the other hand, if the determination is made to use an optimized node, the results of the first node are sent to a selected optimized function in an operation 514. At either the generic function or the optimized function, the per pixel operations of the second node are performed in an operation 516. It is noted that the optimized function performs the same operation for the subset of an unlimited range of inputs as the general case for an unlimited range of inputs.

Figure 6:
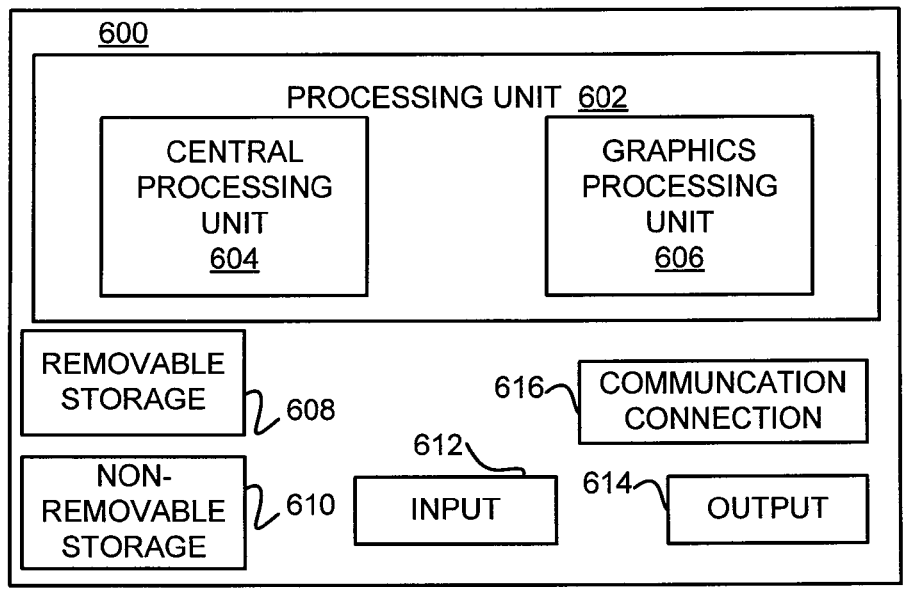
FIG. 6 is a block diagram of an exemplary computing system that may be used to perform the methods described here.

FIG. 6 is a block diagram of a computing device 600 according to an example embodiment. A computing device 600 may include processing unit 602, removable storage 608, and non-removable storage 610. The processing unit may include a central processing unit (CPU) 604 and a graphics processing unit (GPU) 606. Removable storage 608 and/or non-removable storage 610 may include volatile memory and nonvolatile memory. Computer storage includes random access memory (RAM), read-only memory (ROM), erasable programmable read-only memory (EPROM) and electrically erasable programmable read-only memory (EEPROM), flash memory or other memory technology, compact disc read-only memory (e.g. ROM), digital versatile disks (DVD) or other optical disk storage, magnetic cassettes, magnetic tape, it is storage or other magnetic storage devices, or any other medium capable of storing computer-readable instructions. Computing device 600 may include or have access to input 612, output 614, and a communication connection 616. The computer may operate in a networked environment using the communication connection 616 to connect to one or more remote computers, such as database servers. The remote computer may include a personal computer (PC), server, router, a network PC, a peer device, or other common network node, or the like. The communication connection may include a local area network ("LAN"), a wide area network ("WAN"), the Internet, or other networks.

Some embodiments described herein may be useful for more efficiently processing signals by automatically generating optimized functions.

In the foregoing detailed description, reference is made to the accompanying drawings that form a part hereof, in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter.

The foregoing description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on a computer readable medium such as memory or other type of storage devices. Further, described functions may correspond to modules and/or engines, which may include software, hardware, firmware, or any combination thereof. Multiple functions are performed in one or more modules and/or engines as desired, and the embodiments described are merely examples. The software is executed on a digital signal processor, ASIC, microprocessor, or other type of processor operating on a system, such as a personal computer, server, a router, or other device capable of processing data in the network interconnection devices.

Some embodiments implement the functions in two or more specific interconnected hardware-implemented (e.g., processor-implemented) modules, engines, or devices with related control and data signals communicated between and through the modules or engines, or as portions of an application-specific integrated circuit. Thus, the exemplary process flows are applicable to software, firmware, and hardware implementations.

In some embodiments, methods may involve executing instructions to provide a module embodied on a computer-readable medium in a computer apparatus to implement a function module to store a first function for performing an operation on at least a portion of a dataset regardless of an input value associated with the dataset; and to cause at least one processor to implement a compilation engine to optimize the first function by compiling a second function to perform the operation on the at least a portion of the dataset based on the input value being within a predetermined range and to implement a selection engine to determine that the input value is within the predetermined range.

In some embodiments, methods may involve executing instructions to provide a module embodied on a computer-readable medium in a computer apparatus to implement a computer system by causing at least one memory storage device to store a plurality of functions and causing at least one processor to implement a compilation engine to compile a plurality of functions configured to modify an image according to the plurality of functions, each function of the plurality of functions modified based on one or more input values, and a selection engine to select a first function of the plurality of functions based on at least one value associated with a media input.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

It is emphasized that the abstract is provided to comply with 37 C.F.R. §1.72 (b) requiring an Abstract that will allow the reader to quickly ascertain the nature and gist of the technical disclosure. It is submitted with the understanding that it will not be used to interpret the scope or meaning of the claims.

In the foregoing Detailed Description, various features are together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

In the above Detailed Description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like, refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

It will be readily understood by those skilled in the art that various other changes in the details, material, and arrangements of the present method stages which have been described and illustrated in order to a explain the nature of the inventive subject matter may be made without departing from the principles and scope of the inventive subject matter as expressed in the subjoined claims.

What is claimed is:

1. A computer-implemented method comprising:
   using a result of a first function of a staged computation, the first function performed on an input and the result being a constant value, compiling a second function of the staged computation based on the constant value being between a first value and a second value; and
   executing the second function on the input to generate a media output.

2. The computer-implemented method of claim 1, wherein the input comprises an image.

3. The computer-implemented method of claim 2, wherein the second function comprises a per-pixel function to be performed on pixels of the image.

4. The computer-implemented method of claim 1, further comprising compiling the first function based on a characteristic of the input.

5. The computer-implemented method of claim 4, wherein the characteristic of the input comprises a range of pixel values.

6. The computer-implemented method of claim 1, further comprising executing the staged computation on a second input.

7. The computer-implemented method of claim 6, wherein the executing of the staged computation comprises:
   assembling an initial computation using one or more functions including the first function and the second function; and
   upon compiling the first function, modifying the second function using range propagation, the range propagation based on the first function.

8. The computer-implemented method of claim 1, wherein the second function is selected from a plurality of second functions, each second function of the plurality of second functions configured to perform the second function.

9. The computer-implemented method of claim 8, wherein each second function of the plurality of second functions corresponds to a distinct subset of input values.

10. The computer-implemented method of claim 8, wherein at least two second functions of the plurality of second functions correspond to subsets of input values having an overlapping portion.

11. A computer-implemented method comprising:
    using a first filter and a plurality of inputs to generate at least one output, the first filter to filter the inputs having an unlimited range of values associated with the inputs; and
    performing a second function on additional media inputs having values between a first value and a second value, the first value and the second value defining a subset of the unlimited range of values and based on the at least one output, using a second filter, the second filter compiled based on values corresponding to the at least one output.

12. The computer-implemented method of claim 11, further comprising determining that one or more values within the additional media inputs are between the first value and the second value and selecting the second function based on the one or more values being between the first value and the second value.

13. The computer-implemented method of claim 11, wherein compiling the second function is further based on number of times the values between the first value and the second value occur within the plurality of media inputs.

14. The computer-implemented method of claim 11, wherein the second function is compiled by removing a check of array bounds from the first function.

15. The computer-implemented method of claim 11, wherein the second function is compiled by removing tests for zero present in the first function.

16. The computer-implemented method of claim 11, wherein the second function is compiled by removing conditional commands present in the first function.

17. The computer-implemented method of claim 11, wherein the second function is compiled by modifying a loop control variable.

18. A computer apparatus comprising:
a function module to store a first function for performing an operation on at least a portion of a dataset regardless of an input value associated with the dataset; and
at least one processor to implement a compilation module to optimize the first function by compiling a second function to perform the operation on the at least a portion of the dataset based on the input value being between a first value and a second value and to implement a selection module to determine that the input value is between the first value and the second value.

19. The computer apparatus of claim 18, wherein the compilation module is further to compile a third function to perform another operation on another portion of the dataset based on an output value generated by the first function or the second function.

20. A computer-implemented method comprising:
assembling a plurality of image processing functions into a staged computation;
modifying a first image processing function of the assembled plurality of image processing functions based on an image input having a constant value between a first value and a second value; and
modifying the assembled plurality of image processing functions based on the modified first imaging processing function.

21. The computer-implemented method of claim 20, wherein the assembling of the plurality of image processing functions comprises compiling each the plurality of image processing functions.

22. The computer-implemented method of claim 20, wherein the modifying of the first imaging processing function comprises re-compiling the first image processing function.

23. The computer-implemented method of claim 20, wherein the modified image processing function comprises an image processing filter.

\* \* \* \* \*

UNITED STATES PATENT AND TRADEMARK OFFICE
CERTIFICATE OF CORRECTION

PATENT NO.       : 8,442,343 B1
APPLICATION NO.  : 12/475142
DATED            : May 14, 2013
INVENTOR(S)      : Charles F. Rose, III Page 1 of 1

It is certified that error appears in the above-identified patent and that said Letters Patent is hereby corrected as shown below:

In the Claims

In column 12, line 13, in claim 21, before "the", insert --function of--, therefor Signed and Sealed this
Twenty-sixth Day of November, 2013

Margaret A. Focarino
*Commissioner for Patents of the United States Patent and Trademark Office*